United States Patent Office 2,848,469
Patented Aug. 19, 1958

2,848,469

POLYHYDROXYETHYL POLYCARBOXYMETHYL POLYAMINES AND CHELATES

Harry Kroll and Martin Knell, Warwick, R. I., assignors to Geigy Chemical Corporation, New York, N. Y., a corporation of Delaware No Drawing. Application August 13, 1954
Serial No. 449,773

10 Claims. (Cl. 260—429)

This invention is that of the trihydroxyethyl dicarboxymethyl diethylenetriamines, including the three isomers (a) N,N,N''-trihydroxyethyl N',N''-dicarboxymethyl diethylenetriamine, (b) N,N',N'' - trihydroxyethyl N,N''-dicarboxymethyl diethylenetriamine, and (c) N,-N,N'-trihydroxyethyl N'',N''-dicarboxymethyl diethylenetriamine. The invention includes also their water-soluble salts with monovalent cations (e. g. monovalent metals such as the alkali metals, as well as radicals that act as monovalent cations, as the ammonium radical), and also their water-soluble chelates with divalent and higher than divalent metals. The invention includes the preparation of these substances, their chelates, and also their aqueous solutions.

Very few sequestering agents investigated keep ferric iron in solution within the pH range of nine to twelve. For example, at pH 5 one mole of ethylenediamine tetraacetic acid (briefly designated EDTA) will sequester (and thereby hold in solution) approximately seven-tenths of a mole of ferric iron. However, on raising the basicity of the solution, the amount of iron held in solution decreases and is zero at pH 12. Similarly, while a mole of N,N'-dihydroxyethyl N,N'-dicarboxymethyl ethylenediamine holds one mole of ferric iron in solution at pH 5, at pH 9 it holds only half that in solution, and at one percent sodium hydroxide concentration the amount held in solution drops to seven one-hundredths of a mole.

In a study made in the project that produced this invention, diethylenetriamine pentaacetic acid (briefly called DETPA) showed favorable action in solubilizing ferric hydroxide. One mole of the sodium salt of DETPA held in solution approximately one mole of ferric iron. However, raising the alkalinity to pH 9 decreased the sequestering capacity to seven-tenths of a mole of ferric iron per mole of DETPA.

The trihydroxyethyl dicarboxymethyl diethylenetriamines and their water-soluble salts with monovalent cations, of the invention, not only have just as effective sequestering capacity for ferric iron at about pH 5 as do the other products above described, but in contrast to them will retain such iron in solution in the same or even higher concentrations in the more alkaline ranges such as pH 9 to 14.

The products of the invention are illustrated by, but not restricted to, the following example:

*Example 1*

In a round-bottomed, three-necked flask equipped with reflux condenser and bubbling tube, one hundred and thirty grams of ethylene oxide were bubbled into and absorbed by one hundred and three grams of diethylenetriamine. The resulting product was a mixture of two parts of N,N,N''-trihydroxyethyl diethylenetriamine to one part of N,N',N''-trihydroxyethyl diethylenetriamine. One hundred and twenty-seven grams of the mixture of these two trihydroxyethyl diethylenetriamines were dissolved in one hundred grams of fifty percent sodium hydroxide and the solution heated to reflux. Eighty-nine grams of seventy percent glycolonitrile were added to the refluxing solution, dropwise over a period of three hours as fast as the released ammonia was liberated. The final reaction solution was found by titration to contain one millimole per milliliter jointly of both end products, in the ratio of two to one respectively, namely, the mixed disodium salts of (a) N,N,N''-trihydroxyethyl N',N''-dicarboxymethyl diethylenetriamine, and of (b) N,N',N''-trihydroxyethyl N,N''-dicarboxymethyl diethylenetriamine. These free acids are represented by the general formula

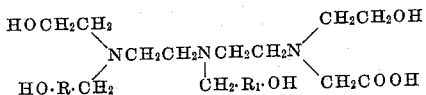

wherein R is the methylene group when $R_1$ is the carbonyl group, and vice versa. At pH 9, one mole of the mixture end product of this example sequestered 1.72 moles of iron and prevented its precipitation as ferric hydroxide.

*Example 2*

N,N,N'trihydroxyethyl N'',N''-dicarboxymethyl diethylenetriamine.—N,N - dihydroxyethyl diethylenetriamine is condensed in substantially equimolecular proportions with benzaldehyde under conditions allowing the removal of water (the oxygen of the aldehyde group with the two hydrogens of a terminal amino group of the amine). In a round-bottomed, three-necked flask equipped with reflux condenser and bubbling tube, forty-four grams (1 mole) of ethylene oxide are bubbled into and absorbed by two hundred and seventy-nine grams (1 mole) of N,N-dihydroxyethyl benzylidineaminoethyl ethylenediamine (separated from the initial step) at a temperature ranging between about thirty to 150° C., due to the exothermic nature of the reaction. The resulting N,N,N'-trihydroxyethyl benzylidineaminoethyl ethylenediamine is hydrolyzed in the presence of hydrochloric acid in merely sufficient water to hydrolyze the product and avoid dissolving the released benzaldehyde and yet to dissolve all of the resulting N,N,N'-trihydroxyethyl diethylenetriamine hydrochloride. This reaction product is then carboxymethylated, to substitute the two required carboxymethyl groups on the unsubstituted nitrogen, by being dissolved in sufficient fifty percent sodium hydroxide solution, heating the solution to reflux, and adding to the refluxing solution sufficient glycolonitrile dropwise, over a period of three hours, as fast as the released ammonia is liberated. Enough sodium hydroxide solution is used to neutralize the hydrochloride and to liberate ammonia from the amount of glycolonitrile necessary to introduce the two carboxymethyl groups, and to leave a slight excess. The resulting product is the disodium salt of N,N,N'-trihydroxyethyl N'',N''-dicarboxymethyl diethylenetriamine.

The corresponding di-alkali metal salt, other than the above disodium salt, of the mixture products of Example 1 and of the product of Example 2, for example, the dipotassium salt, is prepared by replacing the respective amount of fifty percent sodium hydroxide used in the foregoing examples by the stoichiometric equivalent of potassium hydroxide in the corresponding weight of its aqueous solution of similar concentration, and then completing the carboxymethylation with the glycolonitrile in the same way. Any other suitable concentration may be used.

The concentration of the mixed products of Example 1 or of the product of Example 2 (either one of them being referred to as the chelating agent) in any of the foregoing aqueous solutions of any of its di-alkali metal salts is determined by the amount of heavy metal ion, such as copper, which can be bound by the chelating agent. This value is obtained by adding an excess of insoluble copper phosphate to a known volume of solution containing the selected di-alkali metal salts of the mixed free acids of the mixed products of Example 1 or of N,N'-trihydroxyethyl N'',N''-dicarboxymethyl diethylenetriamine and agitating the mixture until an equilibrium is attained. The resulting slurry is centrifuged, and the aqueous supernatant layer is analyzed for copper chelated by the di-alkali metal salt of the polyaminocarboxylic acid. Since one mole of copper combines with one mole of the chelating agent, the chelated copper establishes the concentration of the polyaminocarboxylic acid in solution.

At the same time, the reaction just described with copper phosphate gave the corresponding copper chelate in aqueous solution in the supernatant liquid.

The corresponding iron (ferric as well as ferrous) chelates were made from the above described di-alkali metal, such as the disodium, salt aqueous solution of each of these chelating agents by the same method described below after first determining the amount of iron the chelating agent could hold in solution at pH 9. The method developed for finding the ratio of ferric iron to chelating agent was as follows:

Ane aqueous solution of three milliliters of one-tenth molar ferric chloride and one-tenth molar solution of the chelating agent was adjusted with aqueous sodium hydroxide solution to pH 9 and then diluted to one hundred milliliters. The resulting mixture was agitated for twenty-four hours. The supernatant liquid then was separated by filtration and analyzed for iron colorimetrically. With a molar ratio of one for the iron to the disodium salt of the chelating agent, one hundred grams of the chelating agent were found to bind (or sequester) fifteen grams of iron.

*The ferrous chelate.*—To an aqueous solution containing one hundred grams of either of the foregoing chelating agents or a dialkali metal salt of either of them there was admixed the quantity of an aqueous ferrous sulfate solution containing fifteen grams of iron, and thus yielded the ferrous chelate in solution, but containing the corresponding amount of sodium sulfate.

The solution of the sodium ferrous chelate of the polyaminocarboxylate can be spray dried thereby yielding that chelate in dry form as a brown powder.

*The ferric chelate.*—Was prepared from the aqueous solution of the chelating agent or a di-alkyl metal salt of either of them by admixture with the required volume of an aqueous solution of ferric sulfate to provide the ratio of one hundred grams of the chelating agent to fifteen grams of iron, in the same manner as described with the use of ferrous sulfate for preparation of the ferrous chelate, in aqueous solution. The aqueous solution of the ferric chelate likewise was orange to dark red in color, contained thirty to forty percent of the chelate, and had a pH between 8 and 9. The ferric chelate can also be prepared in similar manner by admixing with the aqueous solution of the chelating agent the corresponding amount of an aqueous solution of some other water-soluble ferric salt that does not destroy the chelating agent, such as ferric chloride or ferric nitrate. It can also be prepared by admixing the required amount of an aqueous suspension of ferric hydroxide. The ferric chelate can be had in dry form also by spray drying the aqueous solution of it.

*The chelating agent in free acid form.*—The aqueous solution obtained above of the di-alkali metal salt, such as the disodium or di-potassium salt, of the chelating agent can be passed in convenient concentration through a column packed with the acid form of a cation exchange resin such as "Dowex–50" (available from the Dow Chemical Company, Midland, Michigan). The column can then be eluted with one-tenth molar ammonium hydroxide to yield an eluate containing the free acid form of the respective chelating agent. The aqueous eluate of such free acid can be evaporated to dryness to yield the compound in dry state.

While the disodium or di-potassium salts of either of these polyhydroxyethyl polycarboxymethyl diethylenetriamines is obtained by the method described above starting with diethylenetriamine or N,N-dihydroxyethyl diethylenetriamine respectively, they and other water-soluble salts can be prepared by direct addition of the calculated theoretical amount of the particular alkali metal hydroxide or other necessary alkaline substance to the free acid, preferably in aqueous solution, and evaporating to dryness.

The water-soluble salts of either of these polyhydroxyethyl polycarboxymethyl diethylenetriamines embraced by the invention, and obtainable, for example, by the just described direct neutralization of one or more of its carboxyl groups are those of the monovalent metals as well as those formed with monovalent cationic radicals. Particularly included are its water-soluble salts with the "alkali-type" cations. Among these latter are its salts with an alkali metal as sodium, potassium, lithium, caesium, as well as those with the nitrogen-containing or ammonia-derived cations, for example, its ammonium salts and its salts with amines, such as with an alkanol-amine as mono-, di-, or tri-ethanolamine or -propanol-amine, or other such alkanolamine particularly lower alkanolamine, or with an alkylamine such as mono-, di-, or trimethylamine or -ethylamine, or other such lower alkylamine. As ammonium salts are so frequently grouped with the alkali metal salts, they likewise can be jointly considered here as illustrative of a monovalent alkali salt of the class consisting of the alkali metal and the ammonium salts.

A monovalently substituted salt is formed when the hydrogen of only one carboxyl group of the polyhydroxyethyl polycarboxymethyl diethylenetriamine is replaced by a monovalent metal or other monovalent cation such as any of the ammonia-derived cations exemplified above. A divalently substituted salt results when the hydrogen of each of the two carboxyl groups similarly is replaced by one or another such monovalent metal or other monovalent cation.

The water-soluble chelate complexes of either of these polyhydroxyethyl polycarboxylmethyl diethylenetriamines, in addition to copper and iron already mentioned above, are those formed with any of other polyvalent metals. Thus, embraced among these chelate complexes of either of these sequestering agents are those of divalent metals such as the alkaline earth metals as barium, calcium, strontium, with magnesium included among them, and the iron group metals iron, nickel, and cobalt, and others such as copper, zinc, and manganese, as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher.

In a chelate complex with a divalent metal, or the divalent state of a metal that has two or more valence states, the hydrogen of each of the carboxyl groups of either of these diethylenetriamine derivatives is replaced by a valence bond of the divalent metal. Then, either of these polyhydroxyethyl polycarboxymethyl diethylenetriamines also forms further complexes with the higher valence states of the various polyvalent metals having at least two valence states as well as with other higher than divalent metals.

Either of these polyhydroxyethyl polycarboxymethyl diethylenetriamines can be used in aqueous solutions to prevent the precipitation of the hydroxides of di-, tri- and tetravalent metal ions, for it is an advantageously effective complexing agent for such metals as calcium, magnesium, copper, zinc, manganese, iron (especially ferric), nickel, and cobalt, and other metals, in such solutions. The salts of either of these polyhydroxyethyl polyaminocarboxylic acids with the "alkali-type" cations, such as its alkali metal salts and ammonia-derived salts, are also useful as sequestering agents as well as for making chelate complexes with the various metal cations indicated. These chelate complexes with iron and the various other metals referred to above are water-soluble.

The iron chelate complex, particularly with ferric iron, is useful in agriculture, as in the treatment of trees suffering from iron chlorosis, for example, citrus trees growing in calcareous soils. As with the iron chelate complexes, others of the metal chelate complexes can likewise be incorporated in fertilizers to be applied to the soil, or dissolved in aqueous solution to be sprayed on the foliage or as a drench, similarly to overcome an unbalanced relative proportion to other metals of the respective one of the so-called minor metals that trees and plants derive from the soil.

Either of these hydroxyethyl polycarboxymethyl diethylenetriamines (in its free acid form), and in some instances its salts with the "alkali-type" cations, can be used in electroplating, and metal treating baths that contain metal ions that would precipitate under the operating conditions, to prevent the precipitation of such metals, for example, to prevent the precipitation of ferric iron.

While the invention has been described in relation to various specific embodiments of it, it is understood that many substitutions and other modifications can be made in it within the scope of the several appending claims that are intended to cover equivalents as well.

What is claimed:

1. A member of the class consisting of (a) N,N,N"-trihydroxyethyl N',N" - dicarboxymethyl diethylenetriamine; (b) N,N',N"-trihydroxyethyl N,N"-dicarboxymethyl diethylenetriamine; (c) N,N,N'-trihydroxyethyl N",N"-dicarboxymethyl diethylenetriamine; (d) the water-soluble salts of (a), (b), and (c) with monovalent cations; (e) the water-soluble chelates of (a), (b), (c) and (d) with polyvalent metals; and (f) aqueous solutions of (a), (b), (c), (d) and (e).

2. N,N,N"-trihydroxyethyl N',N"-dicarboxymethyl diethylenetriamine.

3. A water-soluble salt of N,N,N"-trihydroxyethyl N',N"-dicarboxymethyl diethylenetriamine with a monovalent cation.

4. A water-soluble metal chelate of N,N,N"-trihydroxyethyl N',N"-dicarboxymethyl diethylenetriamine with a polyvalent metal.

5. N,N',N"-trihydroxyethyl N,N"-dicarboxymethyl diethylenetriamine.

6. A water-soluble salt of N,N',N"-trihydroxyethyl N,N"-dicarboxymethyl diethylenetriamine with a monovalent cation.

7. A water-soluble metal chelate of N,N',N"-trihydroxyethyl N,N" - dicarboxymethyl diethylenetriamine with a polyvalent metal.

8. N,N,N'-trihydroxyethyl N",N"-dicarboxymethyl diethylenetriamine.

9. A water-soluble salt of N,N,N'-trihydroxyethyl N",N"-dicarboxymethyl diethylenetriamine with a monovalent cation.

10. A water-soluble metal chelate of N,N,N'-trihydroxyethyl N",N"-dicarboxymethyl diethylenetriamine with a polyvalent metal.

References Cited in the file of this patent

UNITED STATES PATENTS

| | | |
|---|---|---|
| 2,413,856 | Bersworth | Jan. 7, 1947 |
| 2,428,353 | Bersworth | Oct. 7, 1947 |
| 2,532,391 | Bersworth | Dec. 5, 1950 |
| 2,673,213 | Bersworth | Mar. 23, 1954 |

OTHER REFERENCES

Brintzinger et al.: Zeit. für Anor. u. Allgem. Chem., 251 (1943), 285–294.

Bersworth: Chemical Co. Adv. (V) Chem. & Eng., News, 31 (Dec. 7, 1953), 5141.